United States Patent
Hiti et al.

(10) Patent No.: US 7,944,160 B2
(45) Date of Patent: May 17, 2011

(54) REDUNDANT DC BUS DISCHARGE FOR AN ELECTRIC MOTOR SYSTEM

(75) Inventors: Silva Hiti, Redondo Beach, CA (US); David Tang, Fontana, CA (US); Brian A. Welchko, Torrance, CA (US); Milun Perisic, Torance, CA (US); Constantin C. Stancu, Anaheim, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 467 days.

(21) Appl. No.: 12/047,120

(22) Filed: Mar. 12, 2008

(65) Prior Publication Data
US 2009/0230909 A1 Sep. 17, 2009

(51) Int. Cl.
*H02P 21/00* (2006.01)
(52) U.S. Cl. .................. 318/400.02; 318/400.03
(58) Field of Classification Search ............. 318/139, 318/400.02, 400.3, 727
See application file for complete search history.

(56) References Cited

U.S. PATENT DOCUMENTS

| | | | | |
|---|---|---|---|---|
| 5,852,558 A | * | 12/1998 | Julian et al. | 363/132 |
| 5,905,644 A | * | 5/1999 | Blasko et al. | 363/41 |
| 5,909,094 A | * | 6/1999 | Yamada et al. | 318/140 |
| 6,198,240 B1 | * | 3/2001 | Notohara et al. | 318/268 |
| 6,577,483 B1 | * | 6/2003 | Steicher et al. | 361/90 |
| 6,768,284 B2 | * | 7/2004 | Lee et al. | 318/808 |
| 7,135,833 B2 | * | 11/2006 | DeLange et al. | 318/762 |
| 7,737,652 B2 | | 6/2010 | Schwesig | |

FOREIGN PATENT DOCUMENTS

| | | |
|---|---|---|
| DE | 10326328 A1 | 1/2005 |
| DE | 102006042038 B3 | 2/2008 |
| JP | 09070196 A | 3/1997 |

* cited by examiner

*Primary Examiner* — Rina I Duda
(74) *Attorney, Agent, or Firm* — Ingrassia Fisher & Lorenz, P.C.

(57) ABSTRACT

Methods and apparatus are provided for discharging a direct current (DC) bus providing power to a motor control circuit in an electric motor system. The method includes the steps of detecting a predetermined discharge signal and generating operational control signals comprising phase currents for dissipating energy from the DC bus through a passive load in response to detecting the predetermined discharge signal, wherein the passive load includes motor windings of an electric motor of the electric motor system. The method also includes the step of providing the operational control signals to the motor control circuit for discharging the DC bus through the motor control circuit and the motor windings of the electric motor.

20 Claims, 3 Drawing Sheets

REDUNDANT DC BUS DISCHARGE FOR AN ELECTRIC MOTOR SYSTEM

TECHNICAL FIELD

The present invention generally relates to electric motor systems, and more particularly relates to methods and apparati for redundant discharge of a direct current (DC) bus in electric motor systems.

BACKGROUND OF THE INVENTION

Electric motor systems typically include motor control circuits, such as inverters. Power is supplied to the motor control circuits by a direct current (DC) bus having a DC bus capacitor coupled between the high and low voltage nodes of the DC bus. When the DC bus is powered down, the energy stored in the DC bus capacitor is typically discharged by connecting the DC bus to a dedicated discharge circuit which typically includes a large resistor or other dissipative device for discharging the DC bus capacitor. Conventional dedicated discharge circuits to reduce system power losses (i.e., those system power losses which would result from continuous connection of the dissipative device to the DC bus), which are actively connected to the DC bus only when the discharge function is desired, add both size and cost to the motor control circuitry.

Accordingly, it is desirable to provide a DC bus discharge scheme which employs existing circuitry to perform the necessary discharge functions. In addition, it is desirable to provide a reliable DC bus discharge scheme which does not require extraneous information. Furthermore, other desirable features and characteristics of the present invention will become apparent from the subsequent detailed description and the appended claims, taken in conjunction with the accompanying drawings and the foregoing technical field and background.

SUMMARY OF THE INVENTION

An electric motor system is provided for redundantly discharging a direct current (DC) bus providing power to an inverter therefor. The electric motor system includes an electric motor, the inverter, the DC bus, a first processor and a second processor. The inverter is coupled to the electric motor and provides electric control therefore. The DC bus is coupled to the inverter and provides power thereto. The first processor generates first operational control signals comprising phase currents for provision to the inverter in response to a torque command received thereat. In addition, the first processor generates passive load discharging operational control signals in response to detecting a predetermined discharge signal, the passive load discharging operational control signals including phase currents for dissipating energy from the DC bus through a passive load comprising motor windings of the electric motor. The second processor is coupled to the first processor for receiving the first operational signals and the passive load discharging operational control signals therefrom and provides such signals to the inverter. The second processor also generates second operational control signals for providing to the inverter in response to detecting a loss of both the first operational control signals and the passive load discharging operational control signals while detecting the predetermined discharge signal, the second operational control signals comprising ripple current operational control signals for introducing a ripple current into the inverter to discharge the DC bus through the motor windings of the electric motor A method is provided for discharging a direct current (DC) bus providing power to a motor control circuit in an electric motor system. The method includes the steps of detecting a predetermined discharge signal and generating operational control signals comprising phase currents for dissipating energy from the DC bus through a passive load in response to detecting the predetermined discharge signal, wherein the passive load includes motor windings of an electric motor of the electric motor system. The method also includes the step of providing the operational control signals to the motor control circuit for discharging the DC bus through the motor control circuit and the motor windings of the electric motor.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
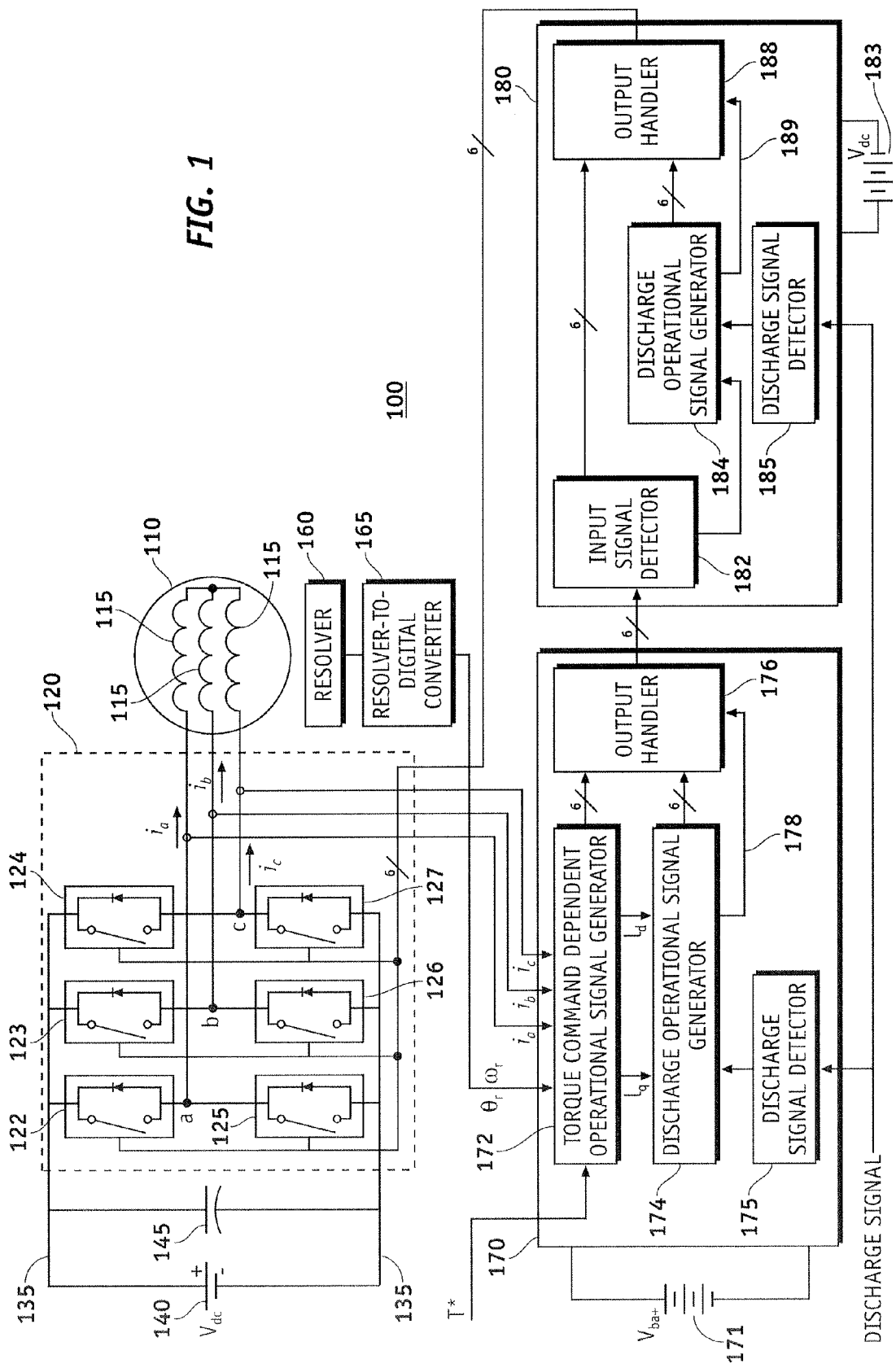
FIG. 1 illustrates a block diagram of an electric motor system in accordance with an embodiment of the present invention.

Referring to FIG. 1, an electric motor system 100 in accordance with an embodiment of the present invention includes a three-phase electric machine 110, such as a salient pole electric motor (e.g., a synchronous reluctance machine or a permanent magnet electric motor) or a non-salient electric motor (e.g., an induction motor), which operates in response to signals from an inverter 120. The inverter 120 providing electric control for the electric motor 110 is connected between direct current (DC) bus lines 135 of a power source 140. The inverter 120 includes switches 122 to 127 and operates in response to operational control signals from a first processor 170 and a second processor 180 to provide voltage to each phase or motor winding 115 of the motor 110, each of the switch pairs 122/125, 123/126 and 124/127 forming a phase leg of the inverter 120. In addition to the switch circuitry depicted in the inverter 120, the switches 122 to 127 could alternatively be implemented by transistors, such as Insulated Gate Bipolar Transistors (IGBTs).

A DC bus capacitor 145 is connected between the DC bus lines 135 for protection of the inverter 120 and the power source 140. A resolver 160 (or similar sensing device or virtual software equivalent) is coupled to the motor 110 for measuring the rotor position and detecting the speed thereof. A resolver-to-digital converter 165 converts the signals from the resolver 160 to digital signals and provides those digital representations of angular position and detected speed of the rotor of the motor 110 to the first processor 170.

The first processor 170 is powered by a power source 171 (such as a battery 171) and includes a torque dependent operational signal generator 172 which receives the digital representations of angular position and detected rotor speed from the resolver-to-digital converter 165 as well as current signals ($I_a$, $I_b$, $I_c$) sensed from each phase 115 of the motor 110. The torque dependent operational signal generator 172 modifies the measured phase currents representations ($I_a$, $I_b$, $I_c$) in response to a torque control signal (torque command T*) to generate operational control signals for provision to the inverter 120, the torque control signal received from a higher level controller.

The first processor 170, in accordance with the present embodiment, also includes a discharge operational signal generator 174 for discharging the DC bus capacitor 145 when the DC bus 135 is powered down through a passive load, the passive load including the motor windings 115 of the motor 110. The torque command dependent operational signal generator 172 modifies the current signals in the synchronous reference frame and, accordingly, transforms the three phase currents ($I_a$, $I_b$, $I_c$) to two synchronous frame phase currents ($I_d$, $I_q$). The discharge operational signal generator 174 also utilizes the synchronous frame phase currents ($I_d$, $I_q$) to generate passive load discharging operational control signals as described hereinafter.

A discharge signal detector 175 generates a detection signal in response to a predetermined discharge signal from a higher level controller and provides the detection signal to the discharge operational signal generator 174. In response to receiving the detection signal, the discharge operational signal generator 174 generates passive load discharging operational control signals in response to the synchronous frame phase currents ($I_d$, $I_q$) and provides the passive load discharging operational control signals to an output handler 176.

The torque command dependent operational signal generator 172 also provides operational control signals to the output handler 176. The output handler 176 typically provides the operational control signals from the torque command dependent operational signal generator 172 to an output of the first processor 170. In response to receiving the detection signal, the discharge operational signal generator 174 provides a signal on line 178 to the output handler 176 to inhibit the operational control signals from the torque command dependent operational signal generator 172 and, instead, to provide the passive load discharging operational control signals at the output of the first processor 170.

The second processor 180 is coupled to the output of the first processor 170 and an input signal detector 182 receives operational control signals (either the operational control signals generated by block 172 in response to the torque control signal T* or the passive load discharging operational control signals generated by block 174) from the output handler 176. The second processor 180 is coupled to a power source 183, such as a battery, and provides redundant discharge protection by a discharge operational signal generator 184. When the input signal detector 182 detects that no operational control signals are being received from the first processor 170 and a discharge signal detector 185 generates a detection signal in response to detecting the predetermined discharge signal, the discharge operational signal generator 184 generates passive load discharging operational control signals for discharging the DC bus 135 including the DC bus capacitor 145.

The second processor 180 provides redundant discharge protection for the inverter 120 and may be implemented, as shown in a dedicated processor 180 or may be implemented in a processor already performing control functions for the inverter 120 and/or the electric motor system 100, such as fault handling.

Controlling the phase currents of the electric motor 110 to a regulated amplitude by the operational control signals generated by the discharge operational signal generators 174, 184, energy from the DC bus 135 is dissipated in the motor windings 115 of the electric motor 110 and inverter losses of the motor control circuit 120. Since the purpose of the regulated phase currents in the motor windings 115 (i.e., the phase currents regulated by the discharge operational control signals) is to discharge the DC bus 135, the electric motor 110 is controlled as if it were a passive load such that no torque is developed therein.

In this manner, existing circuitry (i.e., the first processor 170) may be employed to perform the discharge of the DC bus 135, including the DC bus capacitor 145. The second processor 180, which provides redundant control, utilizes a second discharge operational signal detector 184 to provide redundant discharge protection (i.e., provide redundant means for discharging the DC bus 135) triggered by the absence of operational control signals at the output of the first processor 170 and, as discussed above, may also be implemented in existing circuitry.

Figure 2:
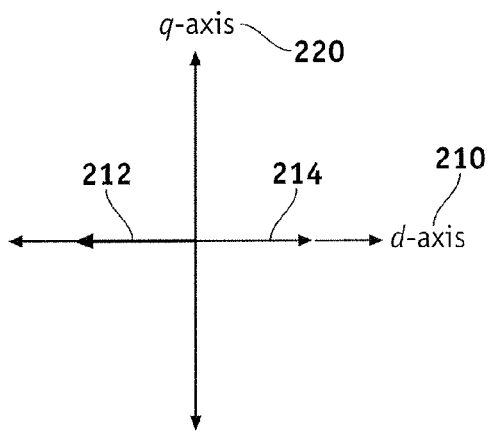
FIG. 2 illustrates a graph of the active discharge current orientation for an electric motor of the electric motor system of FIG. 1 in accordance with the embodiment of the present invention.

Referring to FIG. 2, a graph 200 of the active discharge current orientation for the electric motor 110 in accordance with the present embodiment depicts on an x-axis 210 and a y-axis 220, respectively, the q and d synchronous reference frame components of the phase currents. Several methods may be employed to dissipate energy from the DC bus 135 through a passive load in response to detecting the predetermined discharge signal, the passive load including the motor windings 115 of the electric motor 110. One such method to control the motor phase currents in the motor windings 115 without producing torque comprises regulating the phase currents only in the synchronous reference frame d-axis of the electric motor 110. For salient pole machines, such as interior permanent magnet motors or synchronous reluctance motors, it is desirable to control the phase currents in the negative d-axis 212 of the electric motor 110 as shown in FIG. 2. For non-salient machines, such as induction motors, it is necessary to control the phase currents in the positive d-axis 214. Whether controlling the phase currents 115 in the positive or negative d-axis 210, the q-axis 220 components of the phase currents must be regulated to zero. By controlling the motor phase currents, the DC bus 135 is quickly discharged, at which point, the phase currents of the electric motor 110 naturally decay to zero.

Figure 3:
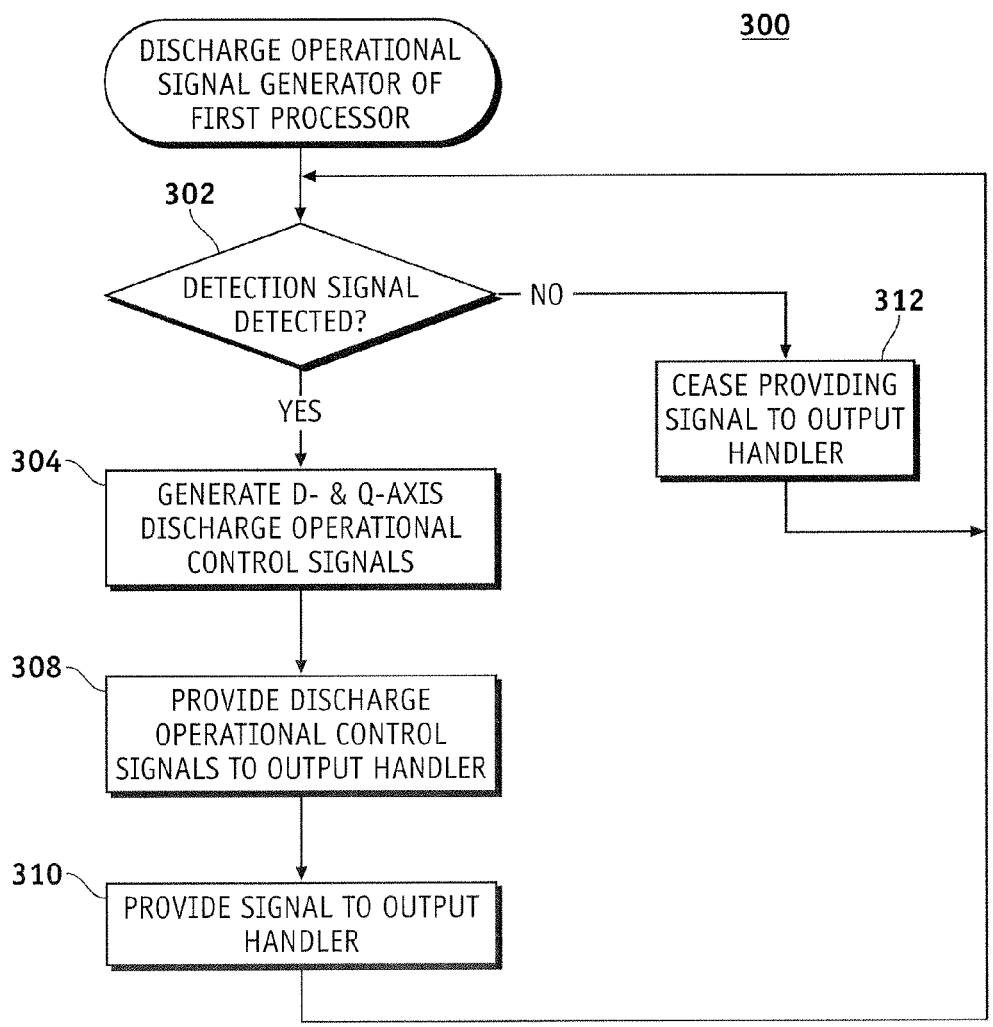
FIG. 3 illustrates a flowchart of the operation of the discharge operational signal generator of the first processor of the electric motor system of FIG. 1 in accordance with the embodiment of the present invention.

Referring to FIG. 3, a flowchart 300 of the operation of the discharge operational signal generator 174 of the first processor 170 of the electric motor system 100 in accordance with the embodiment of the present invention is depicted. When the detection signal from the discharge signal detector 175 is detected 302 (i.e., indicating that the predetermined discharge signal from the higher level controller has been detected by the discharge signal detector 175), discharge operational signals are generated 304 comprising a positive or negative d-axis component and a zero q-axis component. Thus, a nontorque producing d-axis current is employed by the discharge operational signal generator 174 to actively discharge the DC bus 135 during a shutdown sequence initiated by the higher level controller providing the discharge signal to the first processor 170.

The discharge operational signals are provided 308 to the output handler 176 along with a signal 310 on line 178 to signal the output handler 176 to inhibit the flow of the operational control signals from the torque command dependent operational signal generator 172 and, instead, to provide the discharge operational signals from the discharge operational signal generator 174 to the output of the first processor 170. Provision of the discharge operational signals from the output of the first processor 170 continues under the control of the signal provided to the output handler at step 310 until the discharge operational signal generator 174 no longer detects 302 the detection signal from the discharge signal detector 175. When the detection signal is not detected, the discharge operational signal generator 174 ceases 312 providing the signal to the output handler on line 178, thereby allowing the first processor 170 to provide operation control signals from the torque command dependent operational signal generator 172 at the output of the first processor 170.

Figure 4:
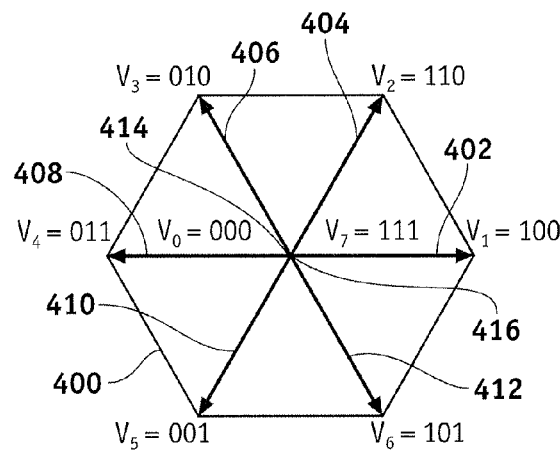
FIG. 4 illustrates a secondary discharge method for the second processor of the electric motor system of FIG. 1 in accordance with the embodiment of the present invention.

Referring to FIG. 4, a secondary discharge method for the second processor 180 for redundant protection of the electric motor system 100 in accordance with the present embodiment of the present invention is illustrated. There are eight possible combinations of the states of the inverter switches 122, 123, 124, 125, 126, 127 and, when the three phase-to-neutral voltages sum to zero, a space vector, called a switching space vector (SSV), can be associated with the state of each of the inverter switches 122, 123, 124, 125, 126, 127. The switching space vectors form a hexagon 400 and any reference output voltage vector falling inside the hexagon boundaries can be produced, on a per cycle average basis, by a combination of the switching space vectors. Inverter switch states 402, 404, 406, 408, 410, 412 are active states as indicated by the vertices of the hexagon 400, and inverter switch states 414, 416 are zero states.

In accordance with the present embodiment, when a loss of control voltage (i.e., operational control signals) is detected by the input signal detector 182 and the discharge signal detector 185 detects the predetermined discharge signal, the discharge operational signal detector 184 employs a ripple current based discharge method for discharging the DC bus 135. The discharge operational signal detector 184 introduces a ripple current into the inverter 120 to discharge the DC bus 135 through the motor windings 115 of the motor 110 by manipulation of voltage vector pairs 402/408, 404/410, 406/412, 414/416.

By generating the discharge operational control signals in response to the vector pairs 402/408, 404/410, 406/412, 414/416, the discharge operational signal detector 184 advantageously introduces a ripple current into the inverter 120 for discharging the DC bus 135 without requiring any information regarding the rotor position of the load of the motor 110 (i.e., without requiring the sensed currents $I_a$, $I_b$, $I_c$ or any information (e.g. $\theta_r$ or $\omega_r$) from the signal from the resolver-to-digital converter 165).

Figure 5:
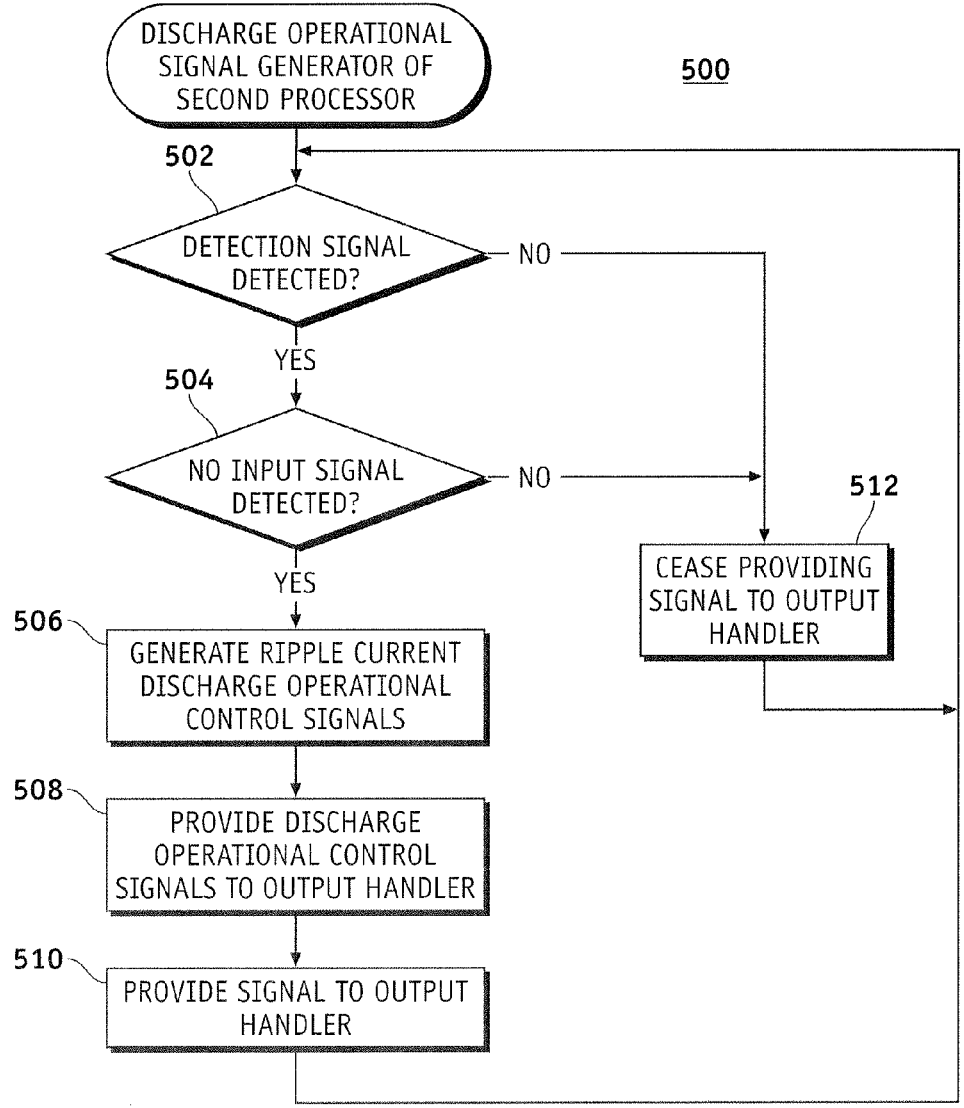
FIG. 5 illustrates a flowchart of the operation of the discharge operational signal generator of the second processor of the electric motor system of FIG. 1 in accordance with the embodiment of the present invention.

Referring to FIG. 5, a flowchart 500 of the operation of the discharge operational signal generator 184 of the second processor 180 of the electric motor system 100 in accordance with the embodiment of the present invention is depicted. When the detection signal from the discharge signal detector 185 is detected 502 (i.e., indicating that the predetermined discharge signal from the higher level controller has been detected by the discharge signal detector 185) and a signal from the input signal detector 182 indicates that no signal is detected thereby 504 (i.e., indicating that no operational control signals are detected at the input signal detector 182), discharge operational signals are generated 506 in response to the vector pairs 402/408, 404/410, 406/412, 414/416 to introduce the ripple current into the motor windings 115 as discussed above. Thus, the ripple current is employed by the discharge operational signal generator 184 to actively discharge the DC bus 135 during a shutdown sequence initiated by the higher level controller providing the discharge signal to the second processor 180 when no operational control signals are received from the first processor 170.

The discharge operational signals are provided 508 to the output handler 188 along with a signal 510 on line 189 to signal the output handler 188 to inhibit the flow of the operational control signals from the input signal detector 182 and, instead, to provide the discharge operational signals from the discharge operational signal generator 184 to the output of the second processor 180. Provision of the discharge operational signals from the output of the second processor 180 continues under the control of the signal provided to the output handler at step 510 until either the discharge operational generator 184 no longer detects 502 the detection signal from the discharge signal detector 185 or the discharge operational generator 184 no longer detects 504 the signal from the input signal detector 182 indicating that no input is received thereat. When the detection signal is not detected 502, the discharge operational generator 184 ceases 512 providing the signal to the output handler on line 189, thereby allowing the second processor 180 to provide operational control signals from the input signal detector 182 at the output of the second processor 180. Likewise, when the signal from the input signal detector 182 is not detected 504 (i.e., indicating that operational control signals are received by the second processor 180), the discharge operational generator 184 also ceases 512 providing the signal to the output handler on line 189, thereby allowing the second processor 180 to provide the operational control signals from the input signal detector 182 to the output of the second processor 180.

As can be seen from the above description, utilizing the passive load of the motor windings 115 of the motor 110 and the losses of the inverter 120 eliminates a dedicated bus discharge circuit. Further, having two independent bus discharge methods enables the elimination of the dedicated hardware implemented bus discharge circuit by providing reliable discharge of the DC bus 135 through the passive load of the motor 110 and the inverter 120 utilizing existing processor circuits and not requiring a twelve volt connection. During an active state, a net voltage is applied to the electric motor 110 while the motor 110 is effectively shorted during a zero state. Adjusting the duty ratios of the active and zero states can apply the desired output voltage to the passive load.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for discharging a direct current (DC) bus providing power to a motor control circuit in an electric motor system, the method comprising the steps of:
   detecting a predetermined discharge signal;
   generating operational control signals comprising phase currents for dissipating energy from the DC bus through a passive load in response to detecting the predetermined discharge signal, wherein the passive load comprises motor windings of an electric motor of the electric motor system; and
   providing the operational control signals to the motor control circuit for discharging the DC bus through the motor control circuit and the motor windings of the electric motor.

2. The method in accordance with claim 1 wherein the step of generating the operational control signals comprises the step of generating operational control signals comprising the phase currents for dissipating the energy from the DC bus through the motor windings of the electric motor while controlling the electric motor to developing no torque therein.

3. The method in accordance with claim 2 wherein the step of generating the operational control signals comprises the steps of:
   generating d-axis synchronous frame operational control signals regulated to control the phase currents of the electric motor in a d-axis synchronous frame to dissipate the energy from the DC bus through the motor windings of the electric motor; and
   generating q-axis synchronous frame operational control signals regulated to control the phase currents of the electric motor in a q-axis synchronous frame to zero.

4. The method in accordance with claim 3 wherein the d-axis synchronous frame comprises a negative d-axis and a positive d-axis, and wherein the step of generating the d-axis synchronous frame operational control signals comprises the step of generating the d-axis synchronous frame operational control signals regulated to control the phase currents of the electric motor in the negative d-axis to dissipate the energy from the DC bus through the motor windings of the electric motor.

5. The method in accordance with claim 3 wherein the d-axis synchronous frame comprises a negative d-axis and a positive d-axis, and wherein the step of generating the d-axis synchronous frame operational control signals comprises the step of generating the d-axis synchronous frame operational control signals regulated to control the phase currents of the electric motor in the positive d-axis to dissipate the energy from the DC bus through the motor windings of the electric motor.

6. The method in accordance with claim 1 further comprising the steps of:
   detecting a loss of the operational control signals comprising the phase currents; and
   generating ripple current operational control signals for introducing a ripple current into the motor control circuit to discharge the DC bus through the motor windings of the electric motor in response to detecting the loss of the operational control signals comprising the phase currents while detecting the predetermined discharge signal.

7. The method in accordance with claim 6 wherein the step of generating the ripple current operational control signals comprises the step of generating the ripple current operational control signals to introduce the ripple current into the motor control circuit in response to voltage vector pairs of the electric motor.

8. A two processor control system for providing operational signals to a motor control circuit in an electric motor system, the motor control circuit receiving power from a direct current (DC) bus, the two processor control system comprising:
   a first processor for generating operational control signals comprising phase currents for provision to the motor control circuit for control of an electric motor of the electric motor system, wherein the first processor further generates first passive load discharging operational control signals in response to detecting a predetermined discharge signal, the first passive load discharging operational control signals comprising the phase currents for dissipating energy from the DC bus through a passive load comprising motor windings of the electric motor; and
   a second processor coupled to the first processor for receiving the operational control signals and the first passive load discharging operational control signals and for providing such signals to the motor control circuit, wherein the second processor generates second passive load discharging operational control signals for providing to the motor control circuit in response to detecting a loss of both the operational control signals and the first passive load discharging operational control signals while detecting the predetermined discharge signal, the second passive load discharging operational control signals comprising ripple current operational control signals for introducing a ripple current into the motor control circuit to discharge the DC bus through the motor windings of the electric motor.

9. The two processor control system in accordance with claim 8 wherein the first processor comprises:
   a first discharge signal detector generating a first detection signal in response to detecting the predetermined discharge signal;
   a first operational signal generator for receiving a torque command and generating the operational control signals in response thereto;
   a second operational signal generator coupled to the first discharge signal detector and generating the first passive load discharging operational control signals in response to receiving the first detection signal from the first discharge signal detector; and
   an output handler coupled to the first and second operational signal generators, the output handler providing the providing the operational control signals to an output of the first processor in response to not receiving a discharge detection signal from the second operational signal generator and providing the first passive load discharging operational control signals to the output of the first processor in response to receiving the discharge detection signal from the second operational signal generator.

10. The two processor control system in accordance with claim 9 wherein the second operational signal generator generates the first passive load discharging operational control signals comprising d-axis synchronous frame operational control signals and q-axis synchronous frame operational control signals, wherein the d-axis synchronous frame operational control signals are regulated to control the phase currents of the electric motor in a d-axis synchronous frame to dissipate the energy from the DC bus through the motor windings of the electric motor and the q-axis synchronous frame operational control signals are regulated to control the phase currents of the electric motor in a q-axis synchronous frame to zero.

11. The two processor control system in accordance with claim 8 wherein the second processor comprises:
an input signal detector coupled to the first processor for receiving therefrom the operational control signals and the first passive load discharging operational control signals and for generating a no input detection signal in response to not receiving either the operational control signals or the first passive load discharging operational control signals thereat;
a second discharge signal detector generating a second detection signal in response to detecting the predetermined discharge signal at an input thereto;
a third operational signal generator coupled to the second discharge signal detector and the input signal detector for generating the second passive load discharging operational control signals when receiving both the second detection signal and the no input detection signal are detected thereat; and
an output handler coupled to the input signal detector and the third operational signal generator for providing the operational control signals or the first passive load discharging operational control signals to the motor control circuit in response to not receiving the second passive load discharging operational control signals from the third operational signal generator and for providing the second passive load discharging operational control signals to the motor control circuit when such signals are received from the third operational signal generator.

12. The two processor control system in accordance with claim 11 wherein the third operational signal generator generates the second passive load discharging operational control signals in response to voltage vector pairs of the electric motor.

13. An electric motor system comprising:
an electric motor;
an inverter coupled to the electric motor and providing electric control therefor;
a direct current (DC) bus coupled to the inverter for providing power thereto;
a first processor for generating operational control signals comprising phase currents for provision to the inverter in response to a torque command received thereat, wherein the first processor further generates first passive load discharging operational control signals in response to detecting a predetermined discharge signal, the first passive load discharging operational control signals comprising the phase currents for dissipating energy from the DC bus through a passive load comprising motor windings of the electric motor; and
a second processor coupled to the first processor for receiving the operational control signals and the first passive load discharging operational control signals and for providing such signals to the inverter, wherein the second processor generates second passive load discharging operational control signals for providing to the inverter in response to detecting a loss of both the operational control signals and the first passive load discharging operational control signals while detecting the predetermined discharge signal, the second passive load discharging operational control signals comprising the phase currents for dissipating the energy from the DC bus through the passive load comprising the motor windings of the electric motor.

14. The electric motor system in accordance with claim 13 wherein the passive load through which the energy from the DC bus is dissipated by the first passive load discharging operational control signals further comprises energy losses in the inverter.

15. The electric motor system in accordance with claim 13 wherein the first processor generates the first passive load discharging operational control signals comprising d-axis synchronous frame operational control signals and q-axis synchronous frame operational control signals, wherein the d-axis synchronous frame operational control signals are regulated to control the phase currents of the electric motor in a d-axis synchronous frame to dissipate the energy from the DC bus through the motor windings of the electric motor and the q-axis synchronous frame operational control signals are regulated to control the phase currents of the electric motor in a q-axis synchronous frame to zero.

16. The electric motor system in accordance with claim 13 wherein the second processor generates the second passive load discharging operational control signals comprising ripple current operational control signals for introducing a ripple current into the inverter to discharge the DC bus through the motor windings of the electric motor.

17. The electric motor system of claim 15 wherein the electric motor is a salient pole electric motor, and wherein the d-axis synchronous frame operational control signals comprise negative d-axis synchronous frame operational control signals.

18. The electric motor system of claim 15 wherein the electric motor is a non-salient electric motor, and wherein the d-axis synchronous frame operational control signals comprise positive d-axis synchronous frame operational control signals.

19. The electric motor system of claim 16 wherein the second processor generates the second passive load discharging operational control signals in response to voltage vector pairs of the electric motor.

20. The electric motor system of claim 13 wherein the inverter comprises a plurality of Insulated Gate Bipolar Transistors (IGBTs), the plurality of IGBTs controlling operation of the electric motor in response to the operational control signals received thereat.

* * * * *